(12) United States Patent
Ito (10) Patent No.: US 7,878,228 B2
(45) Date of Patent: Feb. 1, 2011

(54) HEAVY-DUTY TIRE WITH TREAD HAVING CLOSED SIPES AND EDGE SIPES IN RIBS

(75) Inventor: Kuniaki Ito, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 903 days.

(21) Appl. No.: 11/646,314

(22) Filed: Dec. 28, 2006

(65) Prior Publication Data

US 2007/0151646 A1 Jul. 5, 2007

(30) Foreign Application Priority Data

Dec. 29, 2005 (JP) ............................. 2005-380594

(51) Int. Cl.
*B60C 11/04* (2006.01)
*B60C 11/12* (2006.01)

(52) U.S. Cl. ............................ 152/209.17; 152/209.18; 152/209.25; 152/901; 152/DIG. 3

(58) Field of Classification Search ............ 152/209.17, 152/209.18, 209.22, 209.25, 900, 901, DIG. 3
See application file for complete search history.

(56) References Cited

U.S. PATENT DOCUMENTS

| | | | | |
|---|---|---|---|---|
| 2,612,928 | A * | 10/1952 | Buddenhagen | 152/DIG. 3 |
| 2,821,231 | A * | 1/1958 | Kraft | 152/DIG. 3 |
| 2,926,715 | A * | 3/1960 | Constantakis | 152/DIG. 3 |
| 4,895,684 | A * | 1/1990 | Mattson | 264/326 |
| 6,196,288 | B1 * | 3/2001 | Radulescu et al. | 152/DIG. 3 |
| 6,203,640 | B1 * | 3/2001 | Campana et al. | 152/DIG. 3 |
| 6,213,181 | B1 * | 4/2001 | Janajreh | 152/DIG. 3 |

(Continued)

FOREIGN PATENT DOCUMENTS

CA 1313116 * 1/1993

(Continued)

OTHER PUBLICATIONS machine translation for Japan 08-150812 (no. date).*

(Continued)

*Primary Examiner*—Steven D Maki
(74) *Attorney, Agent, or Firm*—Birch, Stewart, Kolasch & Birch, LLP (57) ABSTRACT

A heavy-duty tire comprises a tread portion provided with at least three circumferentially continuously extending ribs divided by at least two circumferential grooves extending straight in the tire circumferential direction, wherein the ribs have side edges adjacent to the circumferential grooves; each of the side edges is provided with edge sipes at intervals in the tire circumferential direction; each of the edge sipes extends parallel with the tire axial direction from the adjacent circumferential groove and terminates in the rib; each of the edge sipe has an axial length in a range of not less than 5% but not more than 15% of the axial width of the rib, a thickness in a range of not less than 0.3 mm but not more than 1.0 mm and a depth in a range of not less than 50% but not more than 100% of the depth of the circumferential groove; and the total number of the edge sipes per tire is in a range of from 4 to 8 times the value of the tire diameter in millimeter.

5 Claims, 7 Drawing Sheets

U.S. PATENT DOCUMENTS 6,488,064 B1 * 12/2002 Radulescu ............. 152/DIG. 3
2005/0150582 A1 * 7/2005 Matsumura ............ 152/209.18

FOREIGN PATENT DOCUMENTS

| JP | 02-081704 | * | 3/1990 |
| JP | 07-052613 | * | 2/1995 |
| JP | 08-091023 | * | 4/1996 |
| JP | 08-150812 | * | 6/1996 |
| JP | 8-192607 A | | 7/1996 |

OTHER PUBLICATIONS machine translation for Japan 07-052613 (no. date).*

* cited by examiner

HEAVY-DUTY TIRE WITH TREAD HAVING CLOSED SIPES AND EDGE SIPES IN RIBS

BACKGROUND OF THE INVENTION

The present invention relates to a heavy-duty tire, more particularly to a tread pattern suitable for truck/bus tires capable of controlling uneven wear at the edges of a circumferential rib.

A heavy-duty tire for subway cars and monorail cars having tread blocks and zigzag circumferential grooves axially dividing the tread blocks is disclosed in Japanese patent application publication No. 8-192607, wherein in order to reduce uneven wear of the tread, sipes are provided on both sides of the zigzag circumferential grooves, and the positions of the sipes are protruding portions of the zigzag groove walls.

In the case of heavy-duty tires for trucks and buses, in comparison with the tires for subway cars and monorail cars, the traveling conditions are widely and largely varies in use. Therefore, even if sipes are disposed at the protruding portions of the zigzag groove walls, uneven wear occurring on both sides of a circumferential groove can not be prevented.

SUMMARY OF THE INVENTION

It is therefore, an object of the present invention to provide a heavy-duty tire for trucks, buses and the like in which, by combining straight circumferential grooves, circumferential ribs, and a large number of sipes having specific dimensions, uneven wear can be effectively prevented for a long period of tread lifetime.

According to the present invention, a heavy-duty tire comprises a tread portion provided with at least three circumferentially continuously extending ribs divided by at least two circumferential grooves extending straight in the tire circumferential direction, wherein the ribs have side edges adjacent to the circumferential grooves, each of the side edges is provided with edge sipes at intervals in the tire circumferential direction, each of the edge sipes extends parallel with the tire axial direction from the adjacent circumferential groove and terminates in the rib, each of the edge sipe has: an axial length in a range of not less than 5% but not more than 15% of the axial width of the rib; a thickness in a range of not less than 0.3 mm but not more than 1.0 mm; and a depth in a range of not less than 50% but not more than 100% of the depth of the circumferential groove, and the total number of the edge sipes per tire is in a range of from 4 to 8 times the value of the tire diameter in millimeter.

Therefore, the edge portions of the ribs on both sides of the circumferential grooves can be optimized in the rigidity, and the ground pressure of the edge portions is relatively decreased, As a result, wear of the edge portions, and uneven wear spreading therefrom can be effectively prevented.

DESCRIPTION OF THE PREFERRED EMBODIMENTS

Embodiments of the present invention will now be described in detail in conjunction with the accompanying drawings.

The heavy-duty tire according to the present invention has a tread portion, a pair of sidewall portions, and a pair of bead portions as usual, and in order to reinforce the tire, a carcass, a tread reinforcing belt and the like are provided.

Figure 1:
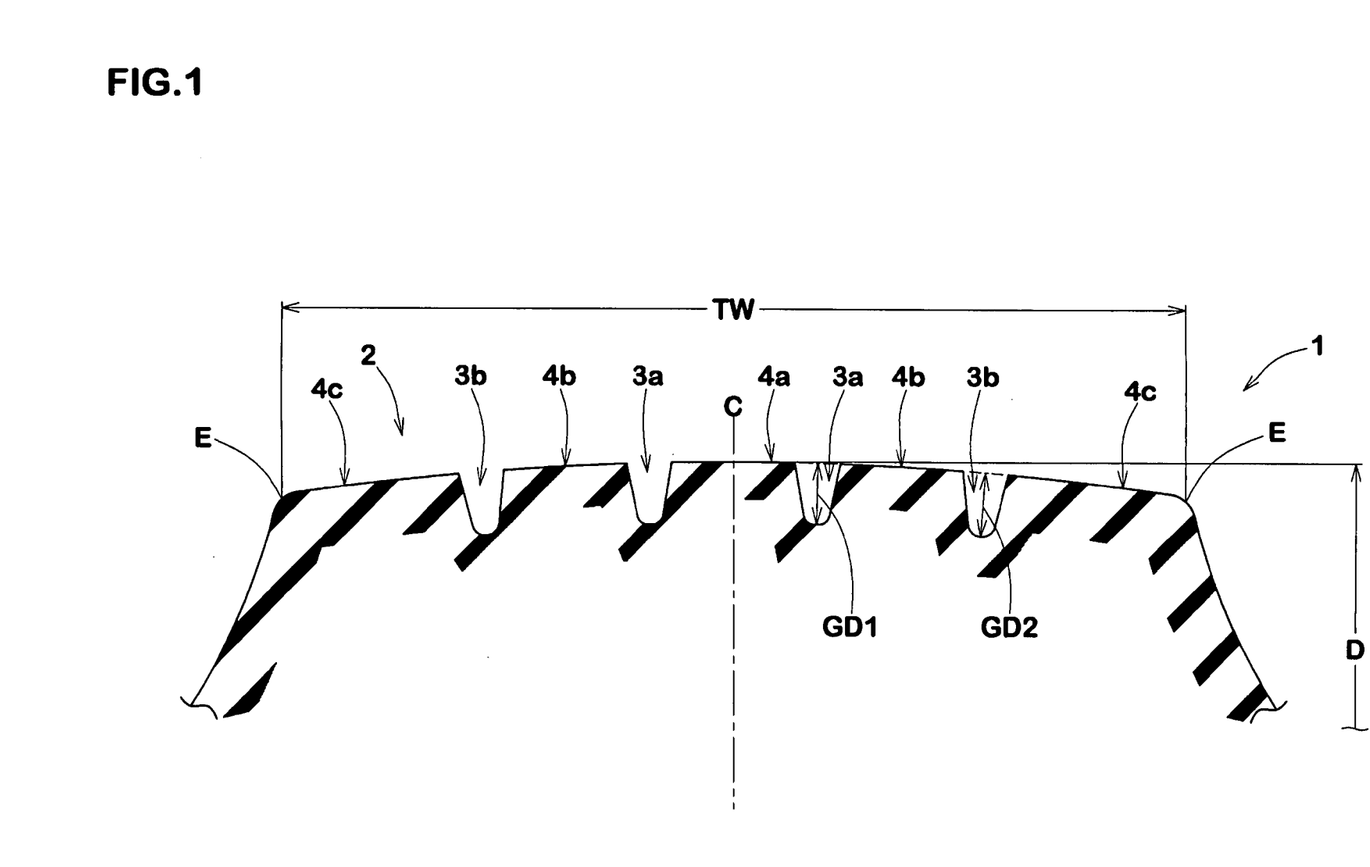
FIG. 1 is a cross sectional view of the tread portion of a heavy-duty tire according to the present invention.
Figure 2:
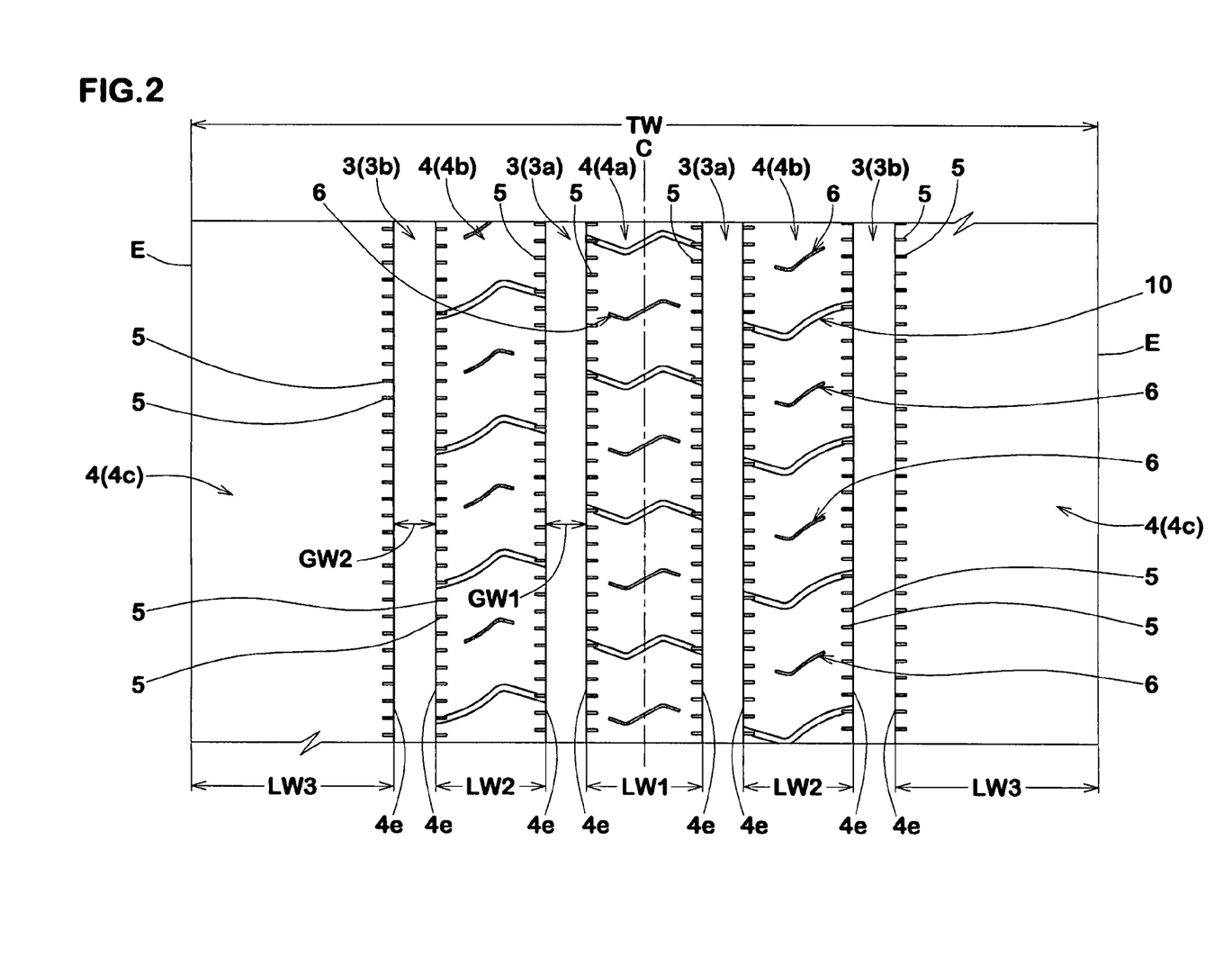
FIG. 2 is a developed partial view of the tread portion showing an example of the tread pattern.

The tread portion 2 is provide with a tread pattern comprising at least two circumferential grooves 3 extending straight and continuously in the tire circumferential direction as shown in FIGS. 1 and 2.

FIG. 2 shows an example of the tread pattern which comprises four circumferential grooves 3 to thereby divide the tread portion 2 into five circumferentially continuously extending ribs 4, wherein the four circumferential grooves 3 are an axially inner crown groove 3a and an axially outer shoulder groove 3b disposed on each side of the tire equator C. As to the axial positions, the four grooves 3 are arranged symmetrically about the tire equator C in this example. As to the widths GW1 and GW2 and depths GD1 and GD2 of the circumferential grooves 3a and 3b, if too small, the drainage becomes insufficient. If too large, the steering stability of the tire is deteriorated. Therefore, the widths GW1 and GW2 are preferably set in a range of not less than 4.0%, more preferably not less than 4.5%, but not more than 7.0%, more preferably not more than 5.5% of the tread width TW. The depths GD1 and GD2 are preferably set in a range of not less than 4.5%, more preferably not less than 5.0%, but not more than 9.5%, more preferably not more than 8.5% of the tread width TW.

Here, the tread width TW is the axial distance between the tread edges E measured in a normally inflated unloaded condition of the tire. The tread edges E are the axial outermost edges of the ground contacting patch (camber angle=0) in a normally inflated loaded condition. The normally inflated unloaded condition is such that the tire is mounted on a standard wheel rim and inflate to a standard pressure but loaded with no tire load. The normally inflated loaded condition is such that the tire is mounted on the standard wheel rim and inflate to the standard pressure and loaded with the standard tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

The above-mentioned five ribs 4 are a center rib 4a between the two grooves 3a, middle ribs 4b between the grooves 3a and 3b, and shoulder ribs 4c between the grooves 3b and tread edges E.

Figure 3:
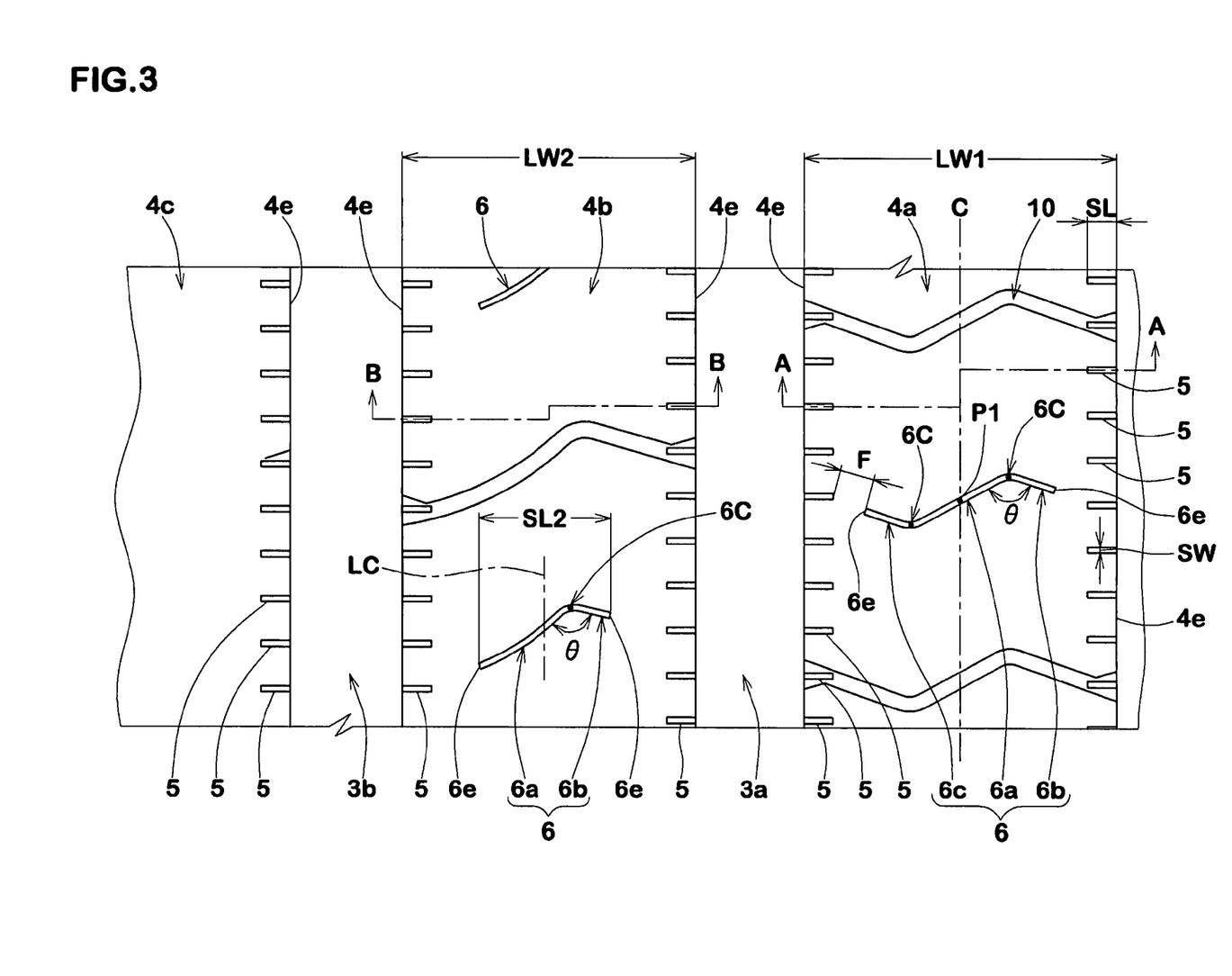
FIG. 3 is an enlarged partial view showing a center circumferential rib and a middle circumferential rib constituting the tread portion.

In this specification, the "rib" means a tread element circumferentially not divided by any axial groove. The "axial groove" means a groove having a significant cross sectional area over the entire width of the rib, more specifically, a depth of more than 4.0 mm and a width of more than 30% of the width GW1, GW2 of the adjacent circumferential groove 3. In FIG. 2 and FIG. 3, grooves for ornamental purposes denoted by "10" are not the axial groove in terms of the depth which is about 1.5 mm.

As to the width (LW1, LW2, LW3) of the rib 4, if too small, as the rigidity of the rib 4 is low, the steering stability is liable to deteriorate. If too large, there is a possibility that the wet performance deteriorates.

On the other hand, in comparison with the center rib 4a and middle ribs 4b, the shoulder ribs 4c are subjected to a large side force during cornering. Therefore, in order to provide a larger resistance to deformation, it is preferable that the shoulder ribs 4c is wider than the center rib 4a and middle rib 4b which have substantially same the widths LW1 and LW2.

Therefore, the widths LW1 and LW2 of the center rib 4a and middle rib 4b are preferably set in a range of not less than 10%, more preferably not less than 12%, but not more than 18%, more preferably not more than 15% of the tread width TW. And the width LW3 of the shoulder rib 4c is set in a range of not less than 1.5 times, more preferably not less than 1.6 times, but not more than 2.0 times, more preferably not more than 1.9 times the width LW1 of the center rib 4a. Incidentally, the widthwise center of the center rib 4a is substantially aligned with the tire equator C.

The ribs 4 have side edges 4e which are defined as being adjacent to the circumferential grooves 3 and extend straight in the tire circumferential direction.

As mentioned above, in this example, as the four circumferential grooves 3 are provided, the number of the side edges 4e is eight, and each of the eight side edges 4e is provided with edge sipes 5 at intervals in the tire circumferential direction.

Each of the edge sipes 5 extends parallel with the tire axial direction to have two axial ends; one is opened to the adjacent circumferential groove 3a, 3b and the other terminates within the rib.

The edge sipes 5 is provided in order to decrease the rigidity of the ribs 4e in the vicinity of the side edges 4e to optimize the ground pressure distribution and thereby controlling uneven wear.

It is therefore, very important to appropriately select the number, arrangement, and configuration of the edge sipes 5.

The edge sipes 5 have to be substantially parallel with the tire axial direction to interest with the side edges 4e perpendicularly so as not to form acute angle corners which becomes starting points of the tear-off and uneven wear.

Figure 4:
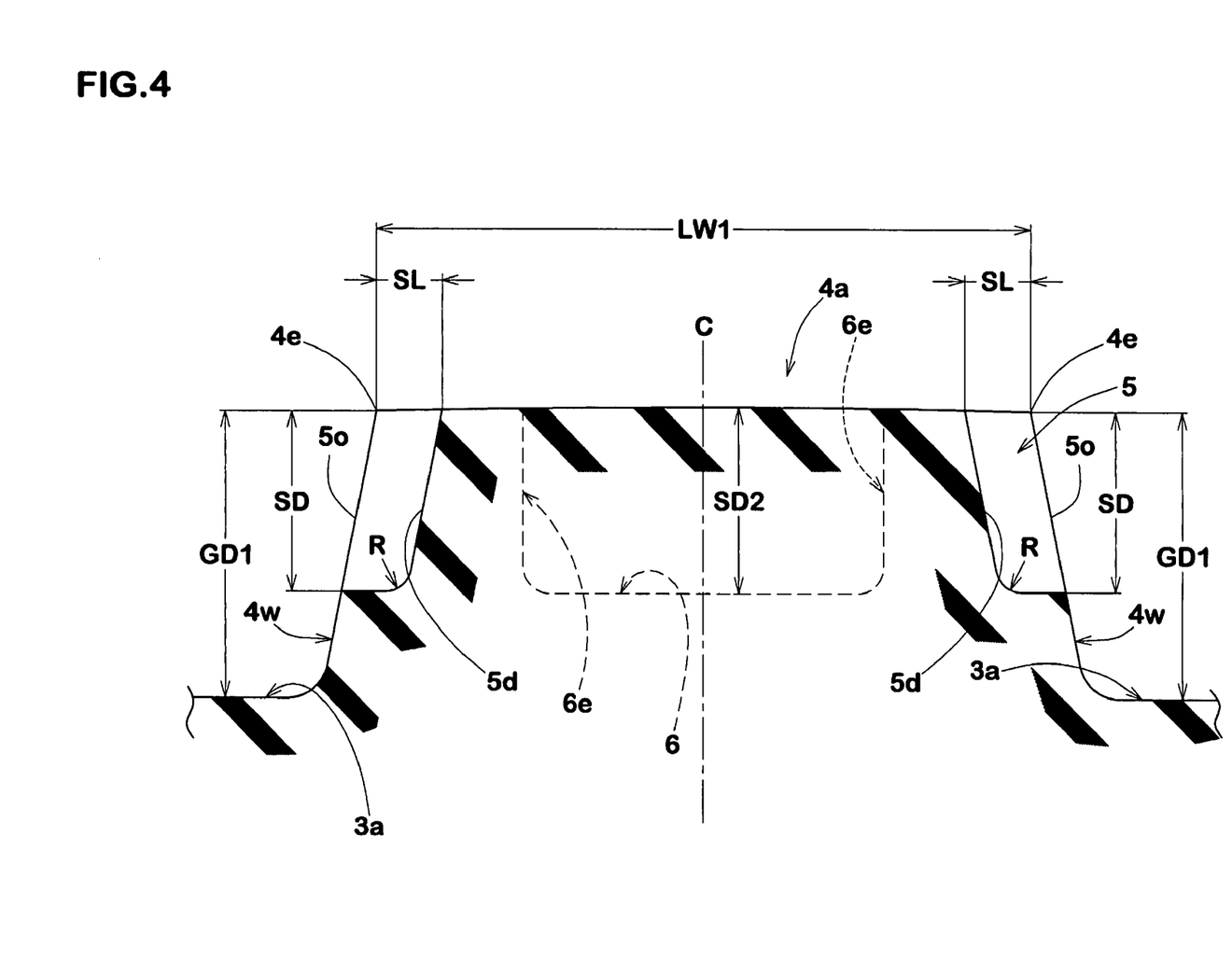
FIG. 4 is an enlarged cross sectional view of the center circumferential rib, taken along line A-A of FIG. 3.

AS shown in FIG. 4, in the cross section along the thickness center of the edge sipe 5, the wall of the closed end 5d thereof is inclined substantially parallel with the open end 5o thereof or the rib's sidewall face 4W so as to maintain the length SL even when the tread rubber wear is progressed to maintain the decreased rigidity. The wall of the closed end 5d is connected, through an arc, to the sipe bottom which is parallel to the tread surface.

Each of the edge sipes 5 has a thickness or groove width SW in a range of not less than 0.3 mm, but not more than 1.0 mm. The edge sipes 5 are molded by the use of sipping blades provided on the inner surface of the tire vulcanizing mold. If the thickness of the blade is less than 0.3 mm, it is difficult to mold the sipe with such a very thin blade. If thickness SW of the sipe 5 is more than 1.0 mm, the rib 4 excessively decreases in the rigidity, and rubber tear, cracks and uneven wear starting from the edge sipes 5 becomes liable to occur. In this example, each edge sipe 5 has a constant thickness SW, but it can be varied within the above-mentioned range. For example. the thickness SW can be decreased gradually from the radially outside to the inside so as to make it easy to remove the blades from the vulcanized tire.

Each of the edge sipes 5 has a length SL in a range not less than 5%, preferably not less than 8%, but not more than 15%, preferably not more than 12% of the width of the rib 4 in the tire axial direction, each measured at the tread surface. If the length SL is less than 5%, the rigidity in the vicinity of the side edges 4e can not be decreased, and uneven wear is unavoidable. If the length SL is more than 15%, the rib rigidity is excessively decreased, and therefore, deterioration of the steering stability and uneven wear become inevitable.

The edge sipes 5 each have a depth SD in a range of more than 40%, preferably more than 50%, but not more than 100%, preferably not more than 80% of the depth of the adjacent circumferential groove 3 in the tire radial direction. If the depth SD less than 40%, when the tread rubber wear reaches to the depth SD, as the sipes disappear, the ground pressure in the vicinity of the side edge 4e can not be controlled. If the depth SD is more than 100%, due to the stress concentrated on the sipe bottom, cracks are liable to occur, decreasing the durability of the rib 4.

If the intervals of the edge sipes 5 is too small, the rigidity of the side edge portion of the rib 4 is excessively decreased. As a result, the steering stability is deteriorated. Especially, steering response when starting to turn the steering wheel becomes bad. Furthermore, uneven wear is liable to occur, starting from the edge sipes 5. Therefore, the total number N of the edge sipes 5 per a tire is set in a range of not more than 8 times, preferably not more than 7 times, more preferably not more than 6 times, but not less than 4 times the value of the tire outer diameter D in millimeters. The tire outer diameter D is the maximum diameter measured under the normally inflated unloaded condition, wherein a fraction below decimal point is rounded out.

In this example, all the eight side edges 4e are provided with the same number (n) of the edge sipes 5. Accordingly, the total number (N) is n*Ne, wherein Ne is the number of the side edges namely, 8.

It is preferable that the edge sipes 5 on each edge 4e are disposed at regular intervals. Further, it is especially preferable that, with respect to the thickness SW, length SL and depth SD, all the edge sipes 5 are the same as each other within each rib 4. Furthermore, to improve the steering stability and the uneven wear in the rib's edges in a well balanced manner, the total of the lengths SL of the edge sipes 5 on each edge 4e is set in a range of from 1400 to 2500 mm. when all the edge sipes 5 are the same length SL, the total is the product SL×n of the length SL and the number (n) of the edge sipes 5 on each edge 4e.

In addition to the edge sipes 5, in this example, the center rib 4a and middle rib 4b are provided with mid sipes 6 each having two ends 6e terminated with in the rib. Preferably, the thickness or groove width of the mid sipe 6 is 0.3 to 1.0 mm.

The mid sipe 6 may be a straight sipe parallel with the tire axial direction. But, it is preferable that, as shown in FIG. 3, the mid sipe 6 is made up of at least two segments 6a and 6b forming at least one corner 6C therebetween, wherein the sipe segment 6a is inclined with respect to the axial direction toward one circumferential direction (in FIG. 3, a right side upward inclination), and the sipe segment 6b is inclined with respect to the axial direction toward the opposite circumferential direction to the sipe segment 6a (thus, a left side upward inclination in FIG. 3).

The ground contacting surface of the rib 4 becomes flat when positioned in the ground contacting patch, while it is cylindrical when position outside the ground contacting patch. Therefore, when entering into the ground contacting patch, the ground contacting surface of the rib 4 is rubbed against the road surface, causing wear.

By providing the mid sipes 6 having the closed-ends, without decreasing the rigidity of the rib 4 in substance, the compressive strain at the ground contacting surface of the rib is mitigated and the amount of slip between the two surfaces can be reduced. As a result, the mid sipes 6 can control the wear of the rib 4. Further, when the slip angle of the tire is not zero, the rib is twisted in the ground contacting patch. But, as the mid sipe 6 is bent or zigzagged, the torsional deformation can be lessened and the slip due to the torsional deformation can be decreased. Further, the opposite side walls of the sipe can engage with each other to restrict their motions, and cracks occurring from the sipes 6 can be controlled.

In order to effectively bring out these advantages, the total number of the mid sipes 6 per one rib 4 is set in a range of not less than 60, preferably not less than 70, but not more than 120, preferably not more than 100. Preferably, the number of the mid sipes 6 per one rib 1 counted in the ground contacting patch is set in a range of from 5 to 8. The mid sipes 6 in each rib 4 are arranged at substantially regular intervals in the tire circumferential direction.

As to the depth SD2 of the mid sipe 6, if too small, as the wear of the tread rubber progresses in use, the mid sipe 6 diminishes and it becomes difficult to obtain the above-mentioned effect. If too large, cracks become liable to occur at the bottom of the mid sipe 6. Therefore, it is preferable that the depth SD2 of the mid sipe 6 is set in a range of 50 to 100% of the depth of the circumferential groove 3 similarly to the edge sipes 5.

In this example, each of the mid sipes 6 in the middle ribs 4b is composed of the above-mentioned two sipe segments 6a and 6b, and accordingly has a single corners 6C which is located on the axially inside of the widthwise center line LC of the rib 4b.

The sipe segment 6a is longer than the sipe segment 6b, and the length of the sipe segment 6a is 1.5 to 2.5 times the length of the sipe segment 6b.

In this example, due to the curvature of the tread profile as shown in FIG. 1, the ground pressure gradually increases towards the tire equator C. In the tread center region, accordingly, even if the amount of slip is small, the wear energy becomes large in generally speaking. Therefore, in order to decrease the wear energy, in the middle rib 4b, the corners 6C of the mid sipe 6 are placed on the tire equator side of the widthwise center line LC of the rib so that the rigidity of the rib is decreased more in the axially inside than the axially outside. As a result, the slip can be controlled more in the axially inside than the axially outside, and uneven wear can be prevented.

In order to effectively bring out these advantages, the axial length SL2 of the mid sipe 6 is set in a range of not less than 35%, preferably not less than 45%, but not more than 70%, preferably not more than 65% of the width of the rib 4.

On the other hand, each of the mid sipes 6 in the center rib 4a is composed of the above-mentioned sipe segments 6a and 6b and an additional sipe segment 6c, wherein the additional sipe segment 6c is inclined in the same direction as the sipe segment 6b, and the sipe segments 6b and 6c are disposed one on each side of the sipe segment 6a. The sipe segments 6b and 6c have substantially same lengths, and the central sipe segment 6a is longer than these two sipe segments 6b and 6c as explained above. Accordingly, the mid sipe 6 in the center rib 4a is zigzag forming two corners 6C.

In the center rib 4a, each of the mid sipes 6 has a substantially symmetrical configuration about its intersecting point P1 with the tire equator C. Accordingly, the two corners 6C are equidistant from the tire equator C. Preferably, the two corners 6C are located at points trisecting the axial width of the rib. Such arrangement can balance the rigidity of the rib between one side and the other side of the tire equator C, while providing the above-mentioned advantages.

In the mid sipe 6, if the angle theta of the corner 6C is too small, rubber tear-off and wear staring from the corners 6C are liable to occur. If too large, the resistance to twist can not be increased. It is therefore, preferable that the angle theta is set in a range of from 120 to 140 degrees, and the corners 6C is rounded by a radius of curvature not more than 10 mm, preferably less than 6 mm, but not less than 3 mm.

If the distances between the mid sipes 6 and the edge sipes 5 are too small, the between parts of the rib are decreased in the rigidity, and there is possibility of causing cracks and the durability is decreased. Therefore, the shortest distances F between the mid sipes 6 and edge sipes 5 are preferably set in a range of not less than 3 mm, more preferably not less than 5 mm.

In the middle ribs 4b, the edge sipes 5A provided at the axially inner side edge 4e can be dimensionally (width, depth, thickness) same as the edge sipes 5B provided at the axially outer side edge 4e. But, it is preferable that the rigidity of the rib is decreased on the tire equator side where a larger wear energy tends to occur, to thereby reduce the slip and wear energy.

Figure 5:
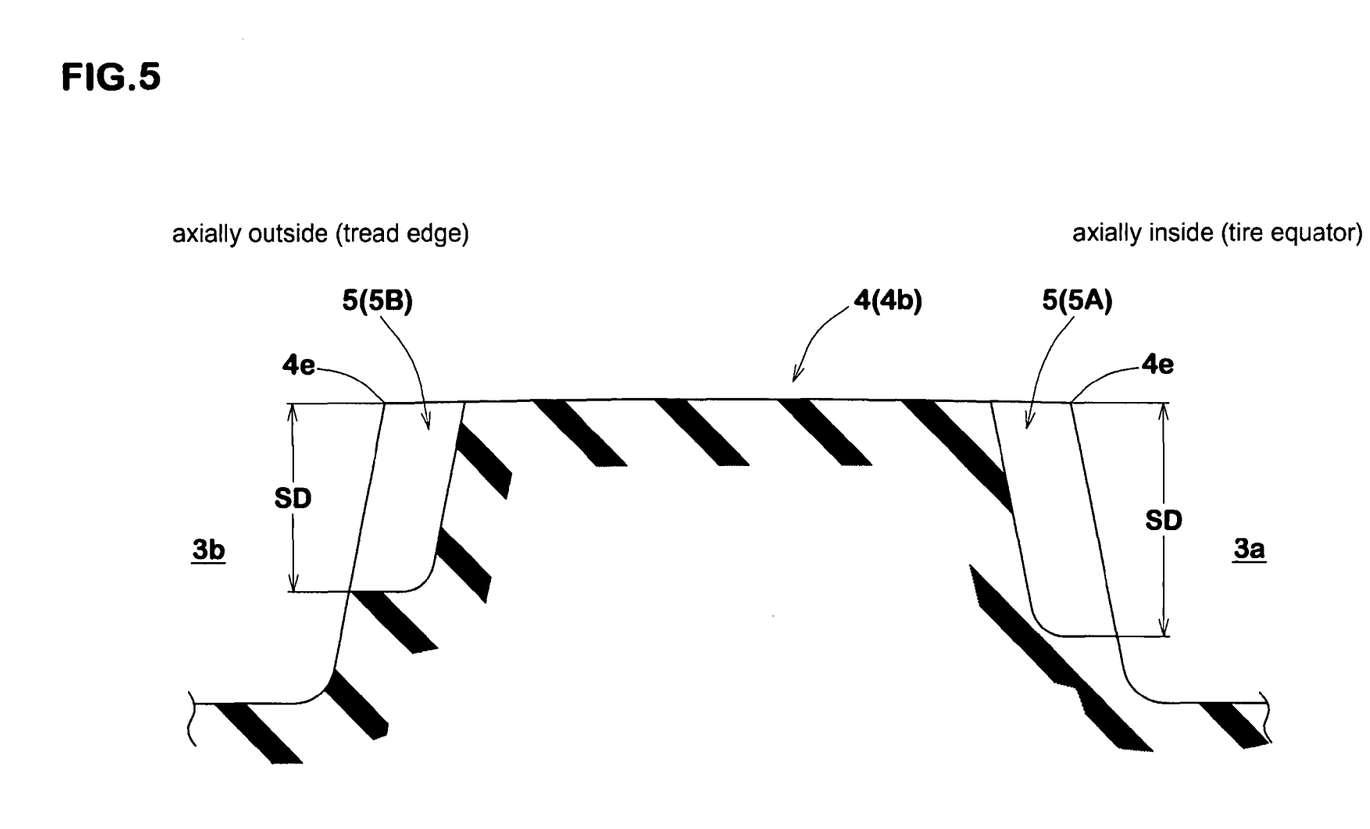
FIG. 5 and FIG. 6 are cross sectional views each taken along line B-B of FIG. 3 and showing an example of the middle circumferential rib.
Figure 6:
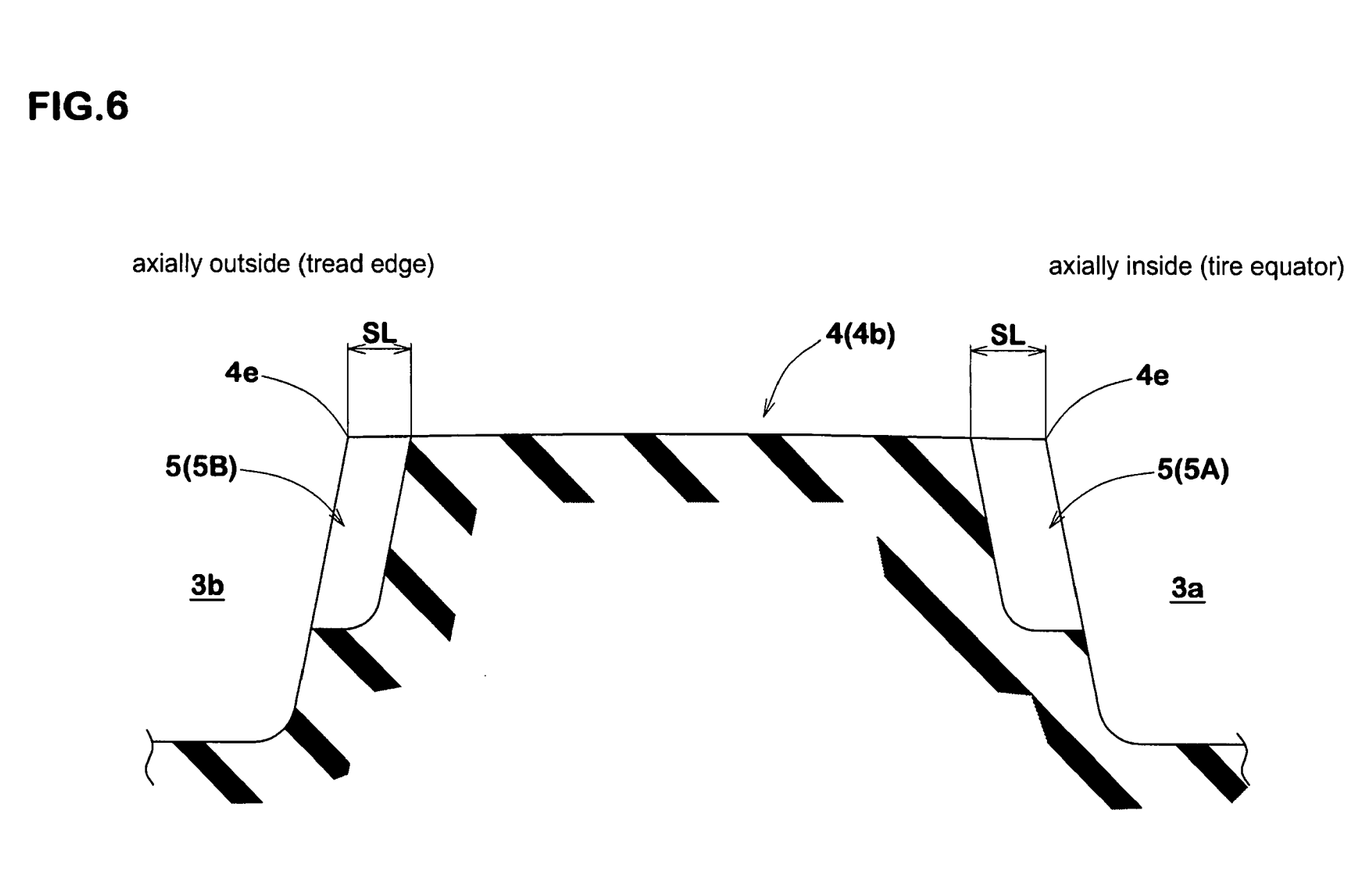

In an example shown in FIG. 5, therefore, in each of the middle ribs 4b, the edge sipes 5A provided at the axially inner side edge 4e are formed to be larger in the depth SD than the edge sipes 5B provided at the axially outer side edge 4e. In a further example shown in FIG. 6, in each of the middle ribs 4b, the edge sipes 5A provided at the axially inner side edge 4e are formed to be larger in the length SL than the edge sipes 5B provided at the axially outer side edge 4e. Also, it is possible that, in each of the middle ribs 4b, the edge sipes 5A provided at the axially inner side edge 4e are formed to be larger in the thickness than the edge sipes 5B provided at the axially outer side edge 4e (not shown). These devices can be employed alone, but it is also possible to employ these in combination.

The pattern shown in FIG. 1 is point symmetric, therefore, the tread pattern in this example is bi-directional. In the present invention, however, the tread pattern can be unidirectional, namely, symmetric about the tire equator.

Comparison Tests

Test tires of size 11R22.5 (rim size 22.5×8.25) for trucks and buses were made and tested for the uneven wear resistance and steering stability. The test tires were radial tires having same internal structures, and tread patterns based on the FIG. 2 pattern. The specifications thereof are shown in

TABLE 1

Common specifications of the test tires are as follows.

| | |
|---|---|
| Tread width TW: | 220 mm |
| Tire outer diameter D: | 1047.5 mm |
| Width of Crown circumferential groove: | 11.0 mm |
| Depth of Crown circumferential groove: | 14.0 mm |
| Width of Shoulder circumferential groove: | 11.0 mm |

TABLE 1-continued

Common specifications of the test tires are as follows.

| | |
|---|---|
| Depth of Shoulder circumferential groove: | 14.0 mm |
| Width LW1 of Center rib: | 30 mm |
| Width LW2 of Middle rib: | 30 mm |
| Width LW3 of Shoulder rib: | 43 mm |

Steering Stability Test

A 10-ton truck provided on the front wheels with test tires was run on a dry asphalt road prepared in a tire test course, and the test driver evaluated the steering stability from a comprehensive standpoint, based on the steering response, rigidity feeling, traction, braking grip. The results are indicated by an index based on Ref. 1 being 100, wherein the larger the index number, the better the steering stability.

Uneven Wear Resistance Test

Figure 7:
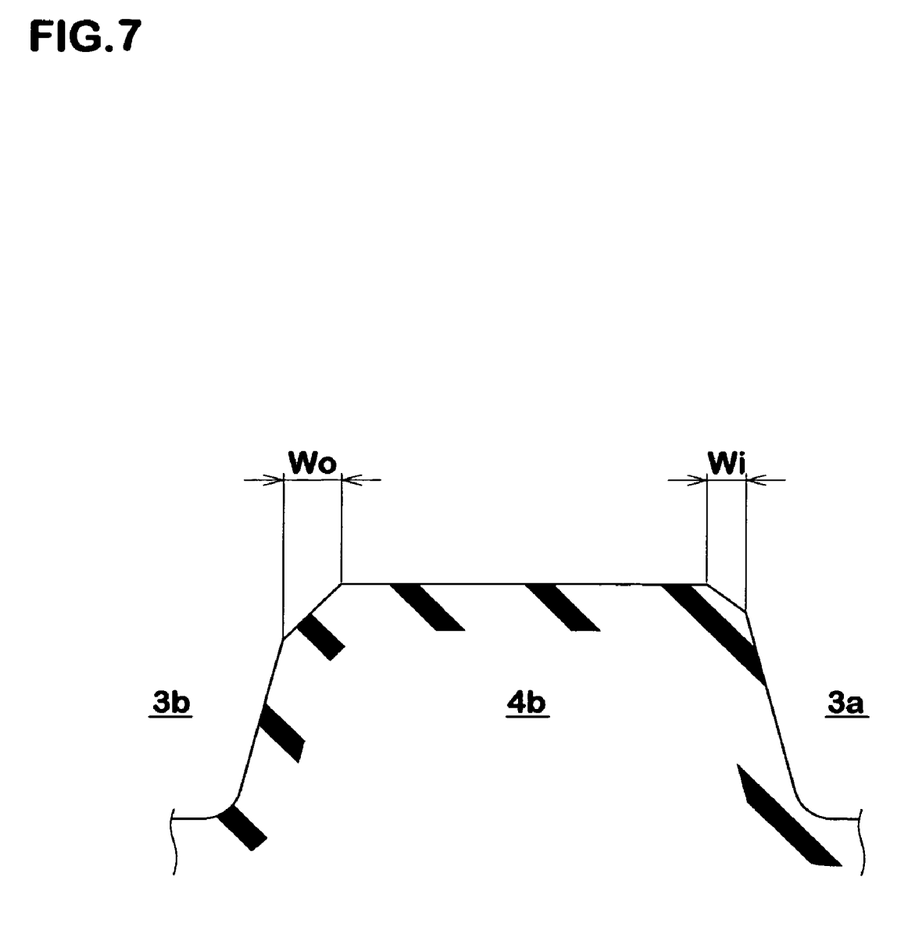
FIG. 7 is a cross sectional view of a circumferential rib for explaining the wear at the side edges thereof.

The above-mentioned truck was run for 10,000 km on expressways, urban roads and mountain roads. Then, as shown in FIG. 7, the widths Wo and Wi of wear were measured on the axially outer and inner side edges of each middle rib at six circumferential positions around the tire, and the average of the twelve measurements was computed. The reciprocal of the average is shown in Table 1 by an index based on Ref. 1 being 100, wherein the larger the index number, the better the uneven wear resistance.

Further, the tire was visually checked whether the tearing-off of the sipes' edges occured or not. The results are shown in Table 1.

TABLE 1

| Tire | Ex. 1 | Ref. 1 | Ref. 2 | Ex. 2 | Ex. 3 | Ex. 4 | Ex. 5 | Ex. 6 | Ex. 7 |
|---|---|---|---|---|---|---|---|---|---|
| Edge sipe | | | | | | | | | |
| Thickness SW (mm) | 0.6 | 0.6 | 0.6 | 0.6 | 0.6 | 0.6 | 0.6 | 0.6 | 0.6 |
| Length SL/LW (%) | 10 | 10 | 10 | 5 | 15 | 10 | 10 | 10 | 10 |
| Depth SD/GD (%) | 50 | 50 | 50 | 50 | 50 | 50 | 50 | 50 | 50 |
| Number "n" | 704 | 352 | 1056 | 704 | 704 | 704 | 704 | 704 | 704 |
| Total number "N" | 5632 | 2816 | 8448 | 5632 | 5632 | 5632 | 5632 | 5632 | 5632 |
| Product "n × SL" | 2112 | 1056 | 3168 | 1056 | 3168 | 2112 | 2112 | 2112 | 2112 |
| Configuration | FIG. 4 | FIG. 4 | FIG. 4 | FIG. 4 | FIG. 4 | FIG. 4 | FIG. 4 | FIG. 4 | FIG. 4 |
| Mid sipes in Center rib | | | | | | | | | |
| Total number | 88 | 88 | 88 | 88 | 88 | 88 | 44 | 88 | 88 |
| Configuration | | | | | | | | | |
| Number of segment | 3 | 3 | 3 | 3 | 3 | 1 | 3 | 3 | 3 |
| Number of corner | 2 | 2 | 2 | 2 | 2 | 0 | 2 | 2 | 2 |
| Angle theta (deg.) | 130 | 130 | 130 | 130 | 130 | — | 130 | 130 | 130 |
| Mid sipes in Middle rib | | | | | | | | | |
| Total number | 176 | 176 | 176 | 176 | 176 | 176 | 176 | 176 | 88 |
| Configuration | | | | | | | | | |
| Number of corner | 2 | 2 | 2 | 2 | 2 | 2 | 2 | 1 | 3 |
| Number of corner | 1 | 1 | 1 | 1 | 1 | 1 | 1 | 0 | 2 |
| Angle theta (deg.) | 130 | 130 | 130 | 130 | 130 | 130 | 130 | — | 130 |
| Uneven wear resistance | 100 | 90 | 101 | 93 | 100 | 94 | 93 | 92 | 93 |
| Steering stability | 100 | 101 | 93 | 101 | 94 | 100 | 100 | 99 | 100 |
| Tearing-off | no | no | yes | no | no | no | no | no | no |

The invention claimed is:

1. A heavy-duty tire comprising a tread portion, the tread portion provided with at least three circumferentially continuously extending ribs divided by at least two circumferential grooves extending straight in the tire circumferential direction, wherein the ribs include a center rib of which widthwise center is substantially aligned with the tire equator, and a pair of middle ribs disposed one on each side of the center rib, the ribs having side edges adjacent to the circumferential grooves, each said side edge provided with edge sipes at intervals in the tire circumferential direction, each said edge sipe extending parallel with the tire axial direction from the adjacent circumferential groove and terminated in the rib, wherein each said edge sipe has: an axial length in a range of not less than 5% but not more than 15% of the axial width of the rib; a thickness in a range of not less than 0.3 mm but not more than 1.0 mm; and a depth in a range of not less than 50% but not more than 100% of the depth of the circumferential groove, and the total number of the edge sipes per tire is in a range of from 4 to 8 times the value of the tire diameter in millimeters, each said middle rib is provided with mid sipes arranged in the tire circumferential direction, wherein each of the mid sipes has two closed ends terminated within the middle rib and has only a first sipe segment (6a) inclined with respect to the tire axial direction toward one circumferential direction, and a second sipe segment (6b) inclined with respect to the tire axial direction toward the opposite circumferential direction to the first sipe segment (6a), and the first sipe segment (6a) is longer than the second sipe segment (6b), whereby a corner formed between the first sipe segment (6a) and the second sipe segment (6b) is located on the axially inside of the widthwise center line of the middle rib, and the center rib is provided with mid sipes arranged in the tire circumferential direction, wherein each of the mid sipes of the center rib has two closed ends terminated within the center rib and is composed of a first sipe segment (6a) inclined with respect to the tire axial direction toward one circumferential direction, a second sipe segment (6b) inclined with respect to the tire axial direction toward the opposite circumferential direction to the first sipe segment (6a), and a third sipe segment (6c) inclined with respect to the tire axial direction toward the opposite circumferential direction to the first sipe segment (6a), and the first sipe segment (6a) extending between the second and third sipe segments (6b) and (6c) is longer than the second and third sipe segments (6b and 6c), and wherein a corner formed between the first sipe segment (6a) and the second sipe segment (6b) is located on one side of the widthwise center line of the center rib, and a corner formed between the first sipe segment (6a) and the third sipe segment (6c) is located on the other side of said widthwise center line of the center rib.

2. The tire according to claim 1, wherein said at least three ribs further include a pair of shoulder ribs wider than the center rib and middle ribs.

3. The tire according to claim 1, wherein the total of the lengths of the edge sipes at each said side edge is in a range of not less than 1400 mm but not more than 2500 mm.

4. The tire according to claim 1, wherein the number of the mid sipes per rib is in a range of not less than 60 but not more than 120.

5. The tire according to claim 1, wherein in each said middle rib, the edge sipes provided at the axially inner side edge are larger in at least one of the thickness, length and depth than the edge sipes provided at the axially outer side edge.

* * * * *